United States Patent
Van Phan et al.

(10) Patent No.: US 12,082,183 B2
(45) Date of Patent: Sep. 3, 2024

(54) SCHEDULING DOWNLINK DATA AND UPLINK DATA BASED ON RECEIVED RESOURCE REQUIREMENTS

(71) Applicant: NOKIA SOLUTIONS AND NETWORKS OY, Espoo (FI)

(72) Inventors: Vinh Van Phan, Oulu (FI); Ling Yu, Kauniainen (FI)

(73) Assignee: Nokia Solutions and Networks Oy, Espoo (FI)

( * ) Notice: Subject to any disclaimer, the term of this patent is extended or adjusted under 35 U.S.C. 154(b) by 546 days.

(21) Appl. No.: 17/250,623

(22) PCT Filed: Aug. 29, 2018

(86) PCT No.: PCT/FI2018/050609
§ 371 (c)(1),
(2) Date: Feb. 11, 2021

(87) PCT Pub. No.: WO2020/043932
PCT Pub. Date: Mar. 5, 2020

(65) Prior Publication Data
US 2022/0022213 A1      Jan. 20, 2022

(51) Int. Cl.
*H04W 72/1263* (2023.01)
*H04W 72/0446* (2023.01)
*H04W 72/23* (2023.01)

(52) U.S. Cl.
CPC ... *H04W 72/1263* (2013.01); *H04W 72/0446* (2013.01); *H04W 72/23* (2023.01)

(58) Field of Classification Search
CPC ......... H04W 72/1263; H04W 72/0446; H04W 72/23; H04W 72/11; H04W 72/543;
(Continued)

(56) References Cited

U.S. PATENT DOCUMENTS

| | | | |
|---|---|---|---|
| 8,964,654 B2 * | 2/2015 | Golitschek Edler Von Elbwart | H04L 1/1861 370/329 |
| 9,380,603 B2 | 6/2016 | Fantaye et al. | |

(Continued)

FOREIGN PATENT DOCUMENTS

| | | |
|---|---|---|
| CN | 102291835 A | 12/2011 |
| CN | 102595599 A | 7/2012 |

(Continued)

OTHER PUBLICATIONS

International Search Report and Written Opinion for PCT Application No. PCT/FI2018/050609, mailed on Dec. 19, 2018, 15 pages.
(Continued)

*Primary Examiner* — Sudesh M Patidar
(74) *Attorney, Agent, or Firm* — Barta Jones, PLLC (57) ABSTRACT

A method performed by an access node includes the reception of dynamic resource requirements from a core network (CN) to perform adaptive scheduling of uplink transmissions linked to downlink data exchanges between the access node and a user device. The method involves configuring uplink and downlink schedule adaptively to accommodate variations in network conditions and user device requirements. The method facilitates an agile response from the core network which corresponds to closed-loop control events while considering real-time feedback from multiple user devices simultaneously.

16 Claims, 7 Drawing Sheets

(58) Field of Classification Search
CPC ..... H04W 72/12; H04W 28/10; H04W 28/02; H04W 28/14; H04W 28/16; H04W 28/26; H04W 28/0975
See application file for complete search history.

(56) References Cited

U.S. PATENT DOCUMENTS

| | | | |
|---|---|---|---|
| 9,591,639 B2* | 3/2017 | Zimmerman | ......... H04W 72/23 |
| 2010/0329188 A1* | 12/2010 | Jen | ......... H04L 1/1896 |
| | | | 370/328 |
| 2012/0275438 A1 | 11/2012 | Dai | |
| 2014/0050090 A1 | 2/2014 | Nordstroem et al. | |
| 2016/0309495 A1 | 10/2016 | Fantaye et al. | |
| 2017/0331577 A1 | 11/2017 | Parkvall et al. | |
| 2018/0077720 A1* | 3/2018 | Wang | ............ H04W 72/21 |
| 2019/0058555 A1* | 2/2019 | Yoo | ............ H04W 28/0278 |
| 2019/0075590 A1* | 3/2019 | Andersson | ............ H04L 1/1858 |
| 2019/0334678 A1* | 10/2019 | Liu | ............ H04L 5/0051 |
| 2019/0357149 A1* | 11/2019 | Zhang | ............ H04W 52/146 |
| 2021/0204286 A1* | 7/2021 | Yang | ............ H04L 1/16 |

FOREIGN PATENT DOCUMENTS

| | | |
|---|---|---|
| CN | 106068670 A | 11/2016 |
| CN | 107683626 A | 2/2018 |
| CN | 108024285 A | 5/2018 |
| CN | 108370579 A | 8/2018 |
| EP | 2757845 A1 | 7/2014 |
| EP | 2882249 A1 | 6/2015 |
| WO | 2017084706 A1 | 5/2017 |

OTHER PUBLICATIONS

Gong et al., "Cross-Layer and End-to-End Optimization for the Integrated Wireless and Wireline Network", Journal of Communications and Networks, vol. 14, No. 5; Oct. 2012, pp. 554-565.

Kim et al., "On the User-Level Satisfactions with User-Level Utility Functions: A Case Study with Scheduling in TDMA Wireless Networks", IEICE Transactions on Communications, vol. E93-B, No. 4, Apr. 2010, pp. 1037-1040.

3GPP TSG SA Meeting #75, SP-170169; "Study on Communication for Automation in Vertical Domains"; Dubrovnik, Croatia, Mar. 8-10, 2017; 3 pages.

3GPP TR 22.804, V0.2.0; 3rd Generation Partnership Project; Technical Specification Group Services and System Aspects; Study on Communication for Automation in Vertical Domains; (Release 15); Sophia Antipolis, Valbonne, France; Aug. 2017; 91 pages.

3GPP TS 22.261 V16.3.0; 3rd Generation Partnership Project; Technical Specification Group Services and System Aspects; Service requirements for the 5G system; Stage 1 (Release 16); Sophia Antipolis, Valbonne, France; Mar. 2018; 54 pages.

European Search Report for Application No. 18932303.3, mailed on Mar. 9, 2022, 9 pages.

Office Action and Search Report for Chinese Application No. 201880097038.1, mailed on Jul. 18, 2023, 20 pages.

First Examination Report for India Application No. 202147012678, mailed on Feb. 4, 2022, 6 pages.

Office action received for corresponding Chinese Patent Application No. 201880097038.1, dated Dec. 15, 2023, 9 pages of office action and no page of translation available.

* cited by examiner

SCHEDULING DOWNLINK DATA AND UPLINK DATA BASED ON RECEIVED RESOURCE REQUIREMENTS

CROSS-REFERENCE TO RELATED APPLICATIONS

This application is a national stage entry of International Application No. PCT/FI2018/050609, filed Aug. 29, 2018, entitled "SCHEDULING DOWNLINK DATA AND UPLINK DATA BASED ON RECEIVED RESOURCE REQUIREMENTS" which is hereby incorporated by reference in its entirety.

TECHNICAL FIELD

This description relates to scheduling transmissions in a wireless network.

BACKGROUND

In wireless networks with a large number of devices sending and receiving transmissions, the transmissions can interfere with each other.

SUMMARY

According to an example, a method performed by an access node can comprise receiving, from a core network (CN), resource requirements for uplink transmissions corresponding to downlink transmissions of data between the access node and a user device, receiving, from the CN, downlink data destined for the user device, determining, based on the received resource requirements, a schedule for the received downlink data and for expected uplink data corresponding to the received downlink data, and sending the schedule to the user device.

According to an example, an apparatus can comprise at least one processor and a non-transitory computer-readable storage device. The non-transitory computer-readable storage device can comprise instructions stored thereon that, when executed by the at least one processor, are configured to cause the apparatus to receive, from a core network (CN), resource requirements for uplink transmissions corresponding to downlink transmissions of data between the apparatus and a user device, receive, from the CN, downlink data destined for the user device, determine, based on the received resource requirements, a schedule for the received downlink data and for expected uplink data corresponding to the received downlink data, and send the schedule to the user device.

According to an example, a non-transitory computer-readable storage medium can comprise instructions stored thereon that, when executed by at least one processor, are configured to cause a wireless station to receive, from a core network (CN), resource requirements for uplink transmissions corresponding to downlink transmissions of data between the wireless station and a user device, receive, from the CN, downlink data destined for the user device, determine, based on the received resource requirements, a schedule for the received downlink data and for expected uplink data corresponding to the received downlink data, and send the schedule to the user device.

The details of one or more implementations are set forth in the accompanying drawings and the description below.

Other features will be apparent from the description and drawings, and from the claims.

DETAILED DESCRIPTION

Figure 1:
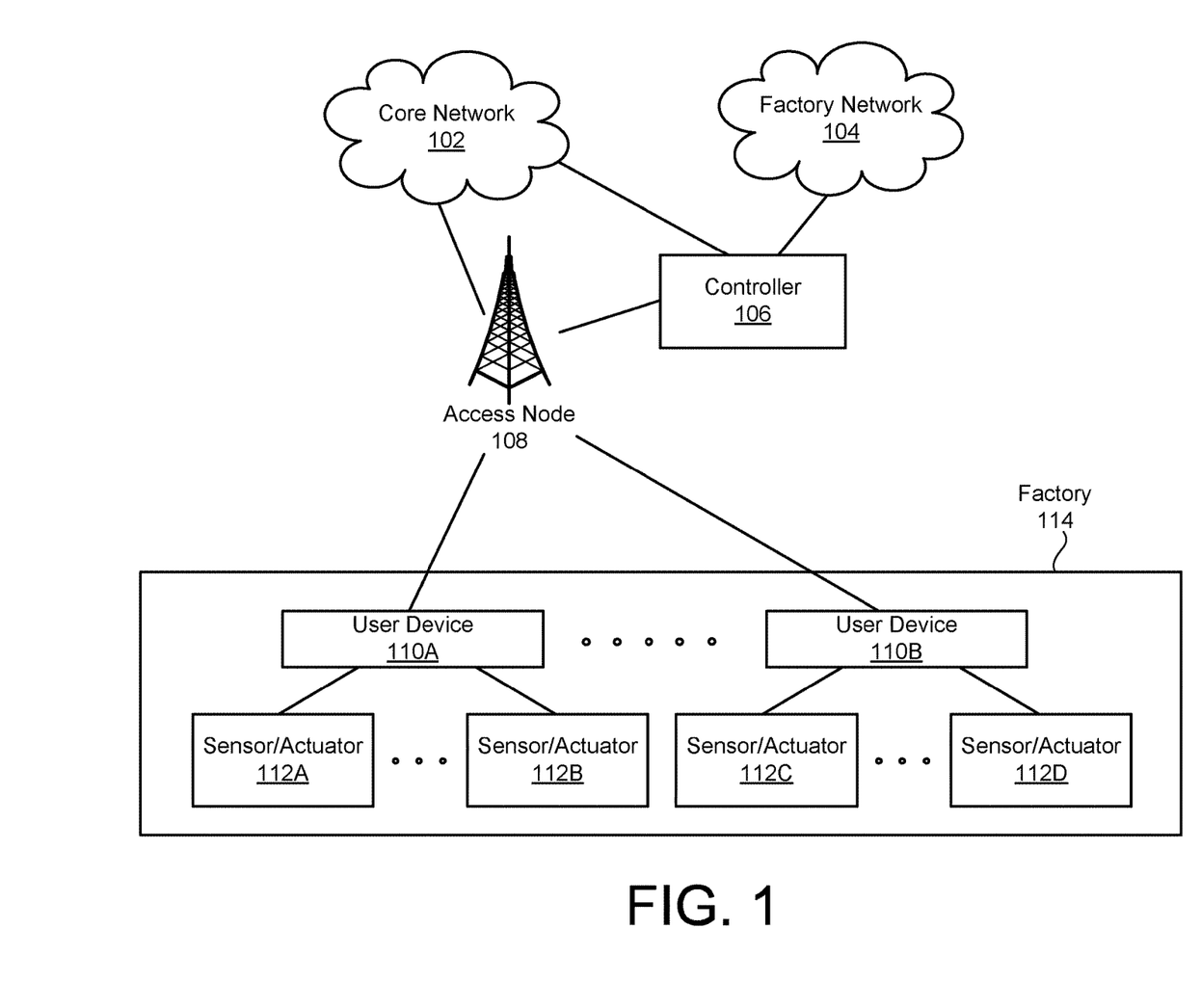
FIG. 1 is a network diagram showing communication links between devices according to an example implementation.

FIG. 1 is a network diagram showing communication links between devices according to an example implementation. In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture. Embodiments described herein may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE and/or E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof. Transmissions from an access node and/or base station to a user device and/or user equipment can be considered downlink transmissions, and transmissions from a user device and/or user equipment to an access node and/or base station can be considered uplink transmissions.

The network can include a core network (CN) 102. The core network 102, which can also be considered a network core, an Evolved Packet Network (EPC), or a backbone network, can direct communications over a packet data network, such as by delivering routes to exchange information among subnetworks.

The network can include a factory network 104. The factory network 104 can route communications between multiple factories, such as the factory 114 shown in FIG. 1. In some examples, the factory network 104 can implement Ultra-Reliable and Low Latency Communication (URLLC) in fifth-generation (5G) New Radio (NR) wireless technology. The factory network 104 can securely deliver data messages end-to-end with high reliability, meeting hard latency requirements. The factory network 104 can implement cooperation and safety functions of autonomous vehicles, monitoring and control in smart grids, tactile feedback in remote medical procedures, control and coordination of unmanned aviation vehicles such as drones, robotics, and/or industrial automation, as non-limiting examples.

The network can include a controller 106. The controller 106 can be in wired or wireless communication with the core network 102, the factory network 104, and/or one or more access nodes 108. The controller 106 can interact with a large number of sensors and/or actuators 112A, 112B, 112C, 112D (described below and referred to collectively as sensors/actuators 112), which can be integrated in a manufacturing unit, such as a factory 114. The controller 106 can periodically submit instructions to the sensors/actuators 112. The controller 106 can submit the instructions to the sensors/actuators within a closed-loop control application. The instructions can be included in messages and/or telegrams. In some examples, the messages and/or telegrams can be less than fifty-six bytes long. The controller 106 therefore may comprise functions of a local serving gateway as well as a local application server for serving factory users.

The sensors/actuators 112 can respond to the instructions from the controller 106 within a cycle time. In some examples, the cycle time from the controller 106 sending the instructions to the sensors/actuators 112 sending their responses can be two milliseconds. The low cycle time can set stringent end-to-end latency constraints on forwarding messages and/or telegrams by the access node 108, such as one millisecond. The messages and/or telegrams can be delivered isochronously. The isochronous delivery of the messages and/or telegrams can place tight constraints on delivery, such as within one microsecond. The communication service from the controller 106 to the sensors/actuators 112 can be highly available, such as 99.9999% available.

In some examples, the closed-loop control of the sensors/actuators 112 by the controller 106 via the access node 108 and user devices (UDs) 110A, 110B (described below and referred to collectively as user devices 110) can be based on individual closed-loop control events. The closed-loop control events can each include a downlink transaction followed by a synchronous uplink transaction. Both the downlink transaction and the uplink transaction can be executed within a cycle time. Parallel closed-loop control events (downlink transactions and uplink transactions between the controller 106 and multiple sensor/actuators) can occur isochronously, with equal time intervals for transactions between the controller 106 and multiple sensors/actuators 112 that are performed concurrently.

A transaction cycle can include a downlink transaction in which the controller 106 sends a command and/or instruction to a sensor/actuator 112, application-layer processing of the command and/or instruction by the sensor/actuator 112, and an uplink transaction in which the sensor/actuator 112 sends a response to controller 106 which is a response to the command and/or instruction. The cycle time of the transaction cycle can include the entire transaction, from the downlink transmission of the command and/or instruction by the controller 106 to the sensor/actuator 112 until the controller 106 receives the response from the sensor/actuator 112. The cycle time can include lower-layer (such as physical layer and/or medium access control (MAC) layer) processing of the instruction and/or command and response, latencies on the air interface, and/or application-layer processing by the sensor/actuator 112.

The access node 108 can be in wired or wireless communication with the core network 102 and/or controller 106. The access node 108 can be in wireless communication with multiple user devices 110A, 110B (referred to collectively as user devices 110). The access node 108 can include an access point (AP), an enhanced Node B (eNB), a gNB, or a network node. The access node 108 can provide wireless coverage within a cell to the user devices 110. The access node 108 can communicate with other access nodes (not shown in FIG. 1) via wired or wireless links, and can control radio resources of the network.

The access node 108 can route communications between the controller 106 and user devices 110 within a factory 114. The user devices 110 can include portable computing devices that include wireless mobile communication devices operating with or without a subscriber identification module (SIM), including, but not limited to, the following types of devices: a mobile station (MS), a mobile phone, a cellphone, a smartphone, a personal digital assistant (PDA), a handset, a device using a wireless modem (such as an alarm or measurement device), a laptop and/or touchscreen computer, a tablet, a phablet, a game console, a notebook, or a multimedia device, as non-limiting examples.

The user devices 110 can route messages between the controller 106 and sensors/actuators 112 in the factory 114. While two user devices 110 are shown in the factory 114, any number of user devices 110 can be included in the factory 114. While four sensors/actuators 112 are shown in the factory 114, any number of sensors/actuators 112 can be included in the factory 114. The sensors/actuators 112 can include sensors that perform measurements, such as measurements of intensity or wavelength of light or other electromagnetic waves, measurements of intensity or frequency of sounds or audio signals, measurements of electrical properties such as voltage or current, or actuators that move machines to perform actions such as making devices, as non-limiting examples.

In some examples, the access node 108 can receive, from the core network 102 and/or the controller 106, information regarding a size of downlink data to send to the user devices 110, and required size and timing information regarding the uplink responses from the user devices 110 associated with the downlink data, as for corresponding closed-loop control applications. Based on the information that the access node 108 received from the core network 102 and/or controller 106, the access node 108 can at once determine a schedule for transmitting the downlink data to the user devices 110 and for the user devices 110 to transmit the uplink responses to the access node 108. The determined schedule can ensure that transmissions meet the quality of service (QoS) requirements for the data carried by the transmissions (latency and reliability) and do not interfere with each other. The access node 108 can send the determined schedule to the user devices 110. After the access node 108 sends the determined schedule to the user devices 110, the access node 108 can send the downlink data, commands, and/or instructions to the user devices 110 according to the schedule, and the user devices 110 can send responses to the access node 108 according to the schedule. In some examples, the receipt from the core network 102 and/or controller 106 of information regarding the size of downlink data and required size and timing information regarding the uplink responses, the determination of the schedule, and sending of the schedule, can be performed by the access node 108 for each user device individually and per an application service (such as per downlink transmission and associated uplink transmission).

Figure 2:
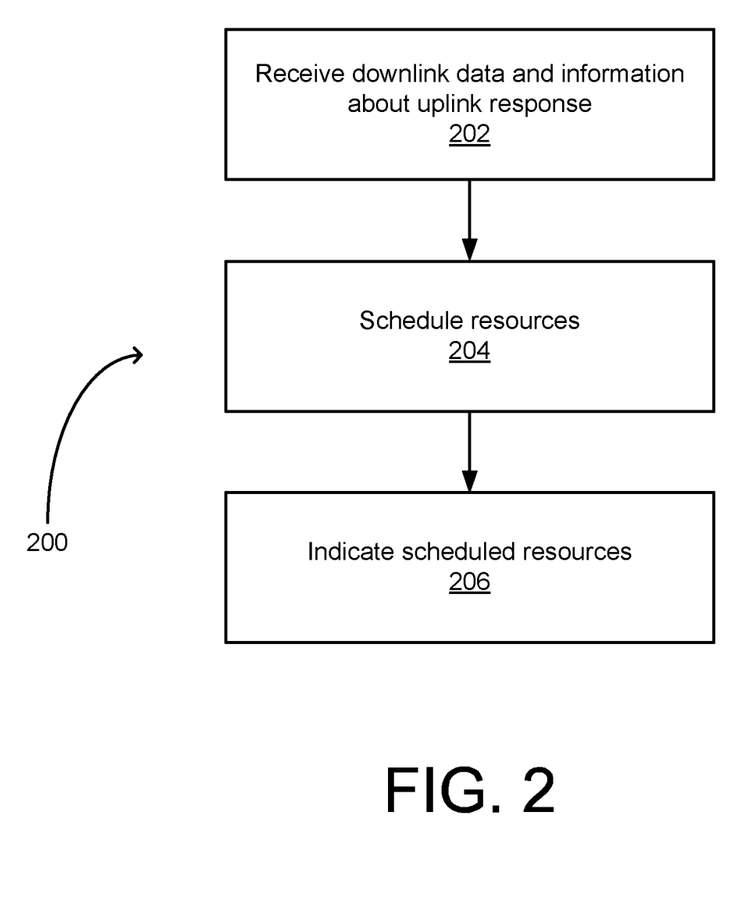
FIG. 2 is a flowchart showing a method for scheduling data according to an example implementation.

FIG. 2 is a flowchart showing a method 200 for scheduling data according to an example implementation. In this example method 200, the access node 108 can receive, from the core network 102 and/or controller 106, downlink data and information about an uplink response(s) from the user device(s) 110 (202). The downlink data can include commands and/or instructions for sensors to perform measurements and/or for actuators to perform movements. The information about the uplink response can include a required size and/or timing of the uplink response associated with the downlink data.

In examples of semi-static closed-loop control of end-to-end applications in which the size and timing of the uplink response associated with the downlink data is semi-static, the access node 108 can receive information regarding the size and timing of the uplink response associated with the downlink data before receiving the uplink data as once-off configuration information, such as during configuration of the packet data unit (PDU) session and radio bearer (RB) corresponding to the downlink and uplink data by the access node 108. The access node 108 can receive the information regarding the size and timing of the uplink response from a mobile management entity (MME) in a Long Term Evolution (LTE) network, or by an access and mobility function (AMF) or session management function (SMF) in a fifth-generation (5G) network using non-access stratum (NAS) or a C-plane.

In examples of dynamic closed-loop control of end-to-end applications in which the size and timing of uplink responses associated with downlink data are dynamic and the downlink data are dynamic, the access node 108 can receive individual packets of the downlink data and, along with the individual packets of the downlink data, the information regarding the size and timing of the associated uplink response. The individual packets can be service data units (SDUs) received by the access node 108 from the core network 102 and/or controller 106, and thereafter sent by the access node 108 to the user devices 110 via a corresponding downlink radio bearer (RB). The access node 108 can receive with the individual SDU an indication (such as per packet) that the access node 108 is expected to receive real-time feedback from the user device 110, as an uplink response associated to the SDU. The indication that the access node 108 is expected to receive the real-time feedback corresponding to the SDU of the downlink data can further specify the size and Ultra-Reliable and Low Latency Communication (URLLC) requirements of the associated uplink response. The access node 108 can receive the individual packets of downlink data and/or the information regarding the size and timing of the uplink response from, for example, the serving gateway (SGW) in an LTE network or the user plane function (UPF) in a 5G network.

The method 200 can include the access node 108 scheduling resources (204). The access node 108 can schedule the resources (204) for transmissions of both the downlink data from the access node 108 to the user devices 110 and the uplink responses from the user devices 110 to the access node 108. The resources can include frequency bands and/or time slots, according to example implementations.

The method 200 can include the access node 108 indicating the scheduled resources (206) to the user devices 110. The access node 108 can indicate the scheduled resources by using L1 (physical layer) signaling to the user devices 110, or by using a combination of L1 signaling and higher-layer signaling, such as by sending the scheduled resources for the transmission of the downlink data using L1 signaling and the scheduled resources for the transmission of the associated uplink data using L2 MAC (medium access control layer) signaling to the user devices 110.

Figure 3:
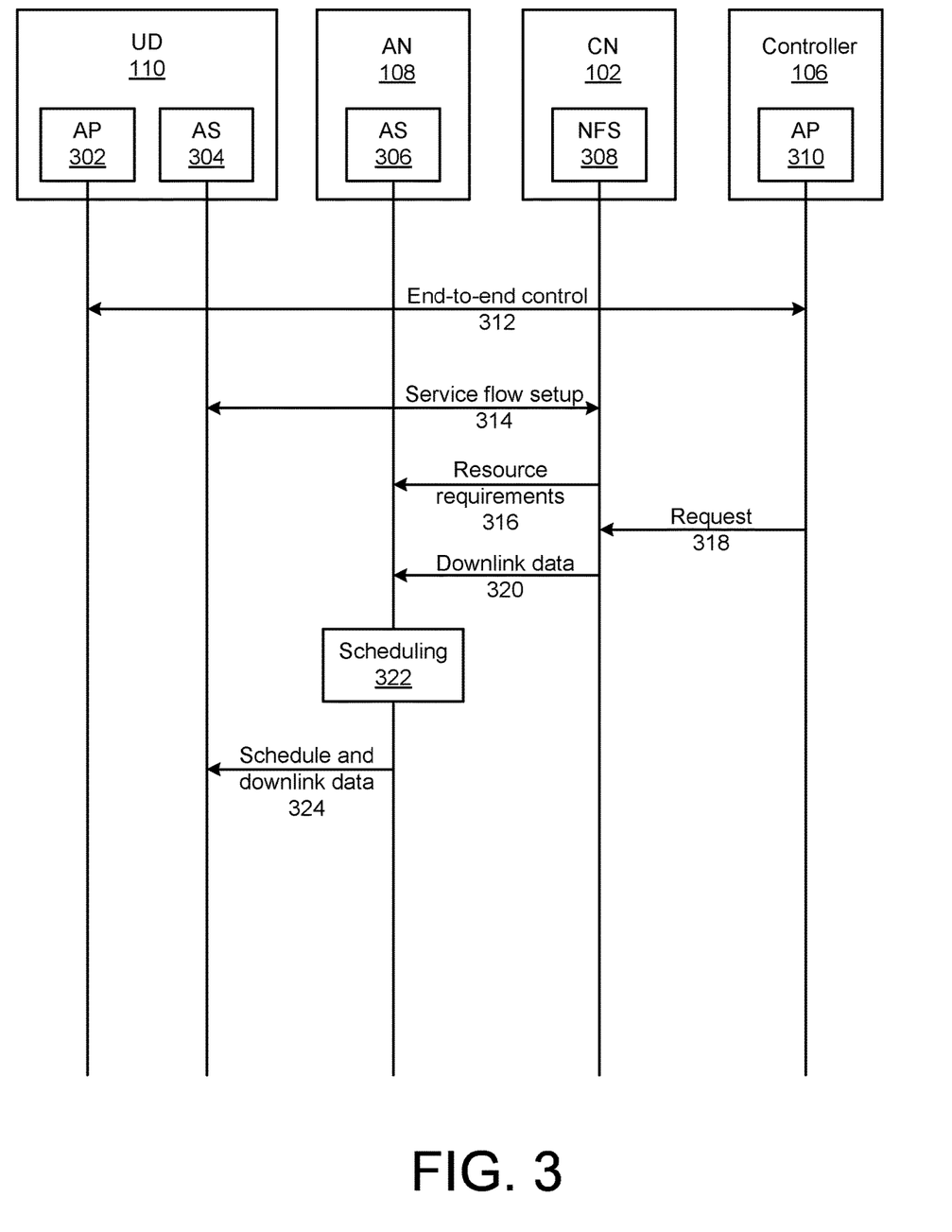
FIG. 3 is a timing diagram showing actions and transmissions for scheduling data according to an example implementation.

FIG. 3 is a timing diagram showing actions and transmissions for scheduling data according to an example implementation. In this example, the user device 110 can include and/or implement an application layer 302 and an access stratum (radio protocol stack) 304, the access node(s) 108 can include an access stratum 306, the core network 102 can include and/or implement one or more network functions 308, and the controller 106 can include and/or implement an application layer 310.

The applications 302, 310 of the user devices 110 and controller 106 can implement end-to-end control 312. The end-to-end control 312 can include the controller 106 sending instructions and/or commands to the user devices 110, and the user devices 110 sending responses to the controller 106. The end-to-end control 312 can be performed in a closed loop, whereby the instructions and/or commands and responses are sent and received between the controller 106 and user devices 110 according to a predefined cycle and operation of the closed loop control application.

One or more of the network functions 308 of the core network 102 can perform service flow setup 314 with the access stratum 304 of the user devices 110. The service flow setup 314 can configure radio bearers (RBs) for uplink and downlink transmissions of data for the end-to-end closed loop control.

One or more network functions 308 of the core network 102 can send resource requirements 316 to the access stratum of the access node 108. The resource requirements 316 can inform the access node 108 of the downlink data and/or the expected size and timing of uplink responses that the user devices 110 will send to the access node 108 in response to the access node 108 sending downlink data, such as commands and/or instructions, to the user devices 110. The received resource requirements 316 can include parameters for uplink transmissions by user devices 110 corresponding to downlink transmissions of data from the access node 108, and/or can correspond to downlink transmissions of data between the access node 108 and user devices 110.

After the access node 108 has been informed of the resource requirements, the application 310 of the controller 106 can send a request 318 to the access node 108. The request 318 can include downlink data, such as commands and/or instructions for the user devices 110 to send to the sensors/actuators 112.

After the core network 102 has received the request from the controller 106, the core network 102 can send downlink data 320 to the access node 108. The received downlink data 320 can include the request 318. The downlink data 320 can be destined for the user devices 110, and/or can have the user devices 110 as a final destination. It is noted that the controller 106 may comprise functions of a local serving gateway as well as a local application server for serving factory users. The access node 108 may receive the downlink data 320 including the request 318 directly from the controller 106.

After receiving the downlink data 320 from the core network 102, the access node 108 can perform scheduling (322). The scheduling (322) can include scheduling both the transmission of the downlink data from the access node 108 to the user device 110, and the transmission of the expected uplink data from the user device 110 to the access node 108. The schedule can be determined based on the received resource requirements including information regarding the size and timing of the associated uplink response to be expected in the corresponding uplink transmission from the user device 110. The uplink transmission and/or downlink transmission can be transmitted by the user device 110 and/or access node 108 via an established uplink RB or logical channel and an established downlink RB or logical channel. An RB or logical channel can by established by scheduling transmission resources, such as frequency ranges and/or timeslots, for the transmission via the RB or logical channel.

Figure 4A:
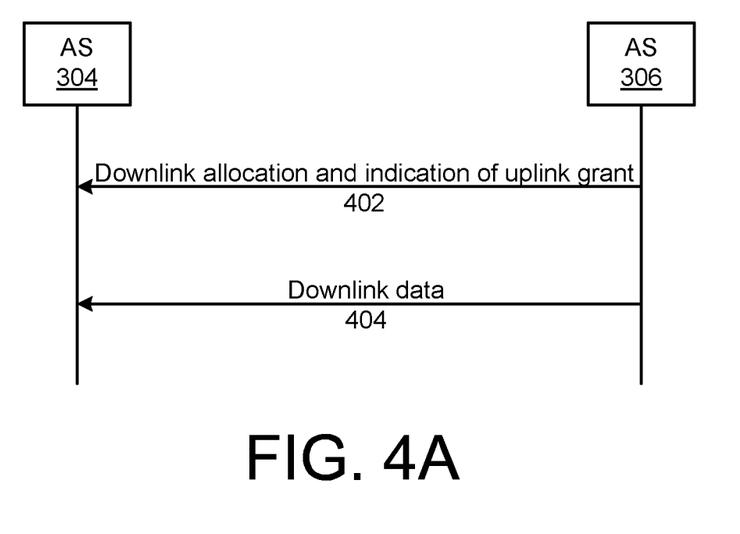
FIG. 4A is a timing diagram showing a schedule for downlink data and uplink data transmitted in a single message according to an example implementation.
Figure 4B:
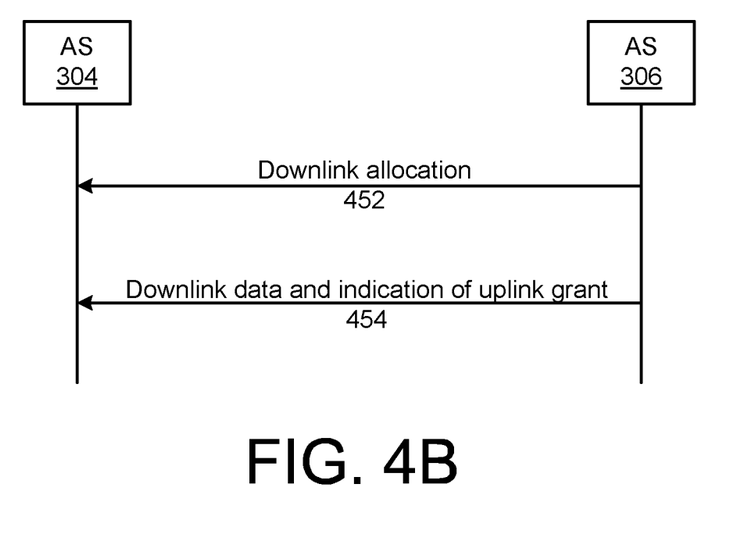
FIG. 4B is a timing diagram showing a schedule for downlink data transmitted in a first message and a schedule for uplink data transmitted in a second message according to an example implementation.

After performing the scheduling (322), the access node 108 can send the schedule and downlink data 324 to the user device 110. In some examples, the access node 108 can send the downlink allocation of the downlink transmission resources and the indication of the uplink transmission resources for the associated uplink response to the user device 110 in a first message and send the downlink data to the user devices in a second message, as shown in FIG. 4A. The downlink data can include downlink instructions. In some examples, the access node 108 can send the downlink allocation of downlink transmission resources in a first message, and send the downlink data and the indication of the uplink transmission resources for the associated uplink response to the user device 110 in a second message, as shown in FIG. 4B. After the access node 108 sends the schedule and downlink data 324 to the user device 110, the user device 110 can send the expected uplink response, in response to the downlink data, to the access node 108. The access node 108 can determine the schedule (322) and send the determined schedule to the user device 110 without receiving a scheduling request from the user device 110.

FIG. 4A is a timing diagram showing a schedule 402 for downlink data and uplink data transmitted in a single message according to an example implementation. In this example, the access stratum 306 of the access node 108 can send the schedule 402 to the access stratum of the user devices 110. The schedule 402 can be included in a physical downlink control channel (PDCCH). The schedule 402 can include the downlink allocation of downlink communication resources and an indication of the uplink grant for resources via which the user device(s) 110 will send the uplink response(s) associated with the downlink data. In some examples, the schedule 402 for both the received downlink data and expected uplink data can be included in a single instance of a PDCCH.

After sending the schedule 402 to the user device(s) 110, the access node 108 can send the downlink data 404 to the user device(s) 110. The downlink data 404 can include instructions and/or commands, such as instructions and/or commands for sensors to perform measurements and/or for actuators to perform movements. In some examples, the downlink data can be included in a transport block (TB). In some examples, both the downlink allocation and the indication of uplink grant included in the schedule 402 are included in L1 (physical layer) signaling. In some examples, both the downlink allocation and the indication of uplink grant included in the schedule 402 can be included in a same PDCCH instance in a 5G network, and/or when the timing of the associated uplink response is very critical.

FIG. 4B is a timing diagram showing a schedule for downlink data transmitted in a first message and a schedule for uplink data transmitted in a second message according to an example implementation. In this example, the access stratum 306 of the access node 108 can send a downlink allocation 452 to the access stratum 304 of the user device 110. The downlink allocation 452 can include an allocation of downlink communication resources via which the user device 110 will receive the downlink data from the access node 108. The downlink allocation 452 can be included in a physical downlink control channel (PDCCH). The PDCCH can include the downlink schedule and, optionally, an indication that the uplink schedule will be included in a message (454) that also includes the received downlink data 320.

After sending the downlink allocation 452 to the user device 110, the access node 108 can send downlink data and an indication of uplink grant 454 to the user devices 110. The downlink data and indication of uplink grant 454 can be included in a single transport block (TB). The indication of the uplink grant can identify communication resources, such as frequencies and/or time slots, via which the user devices 110 can send responses to the access node 108. The indication of the uplink grant can be included in a medium access control (MAC) control element (MAC_CE) for example. In some examples, the downlink allocation 452 and the uplink grant can be included in separate messages in an LTE network, and/or when the timing of the associated uplink response is less important.

In some examples applicable to the examples shown in both FIGS. 4A and 4B, the access node 108 can signal the uplink grant for the uplink response to the user device with a one-bit and/or single-bit indication, if a mapping rule from allocated downlink resources to uplink resources is predefined and/or configured during radio bearer configuration for serving the closed-loop control application. In some examples, the indication of the uplink grant can include timing information, such as a subframe number or a time window given by a starting subframe and an ending subframe or a window size in number of subframes via which the user devices 110 will receive a scheduled uplink grant for transmitting the uplink response. The inclusion of timing information in the uplink grant can give the access node 108 flexibility to dynamically optimize utilization of communication resources, and can reduce overhead at the user devices 110.

Figure 5:
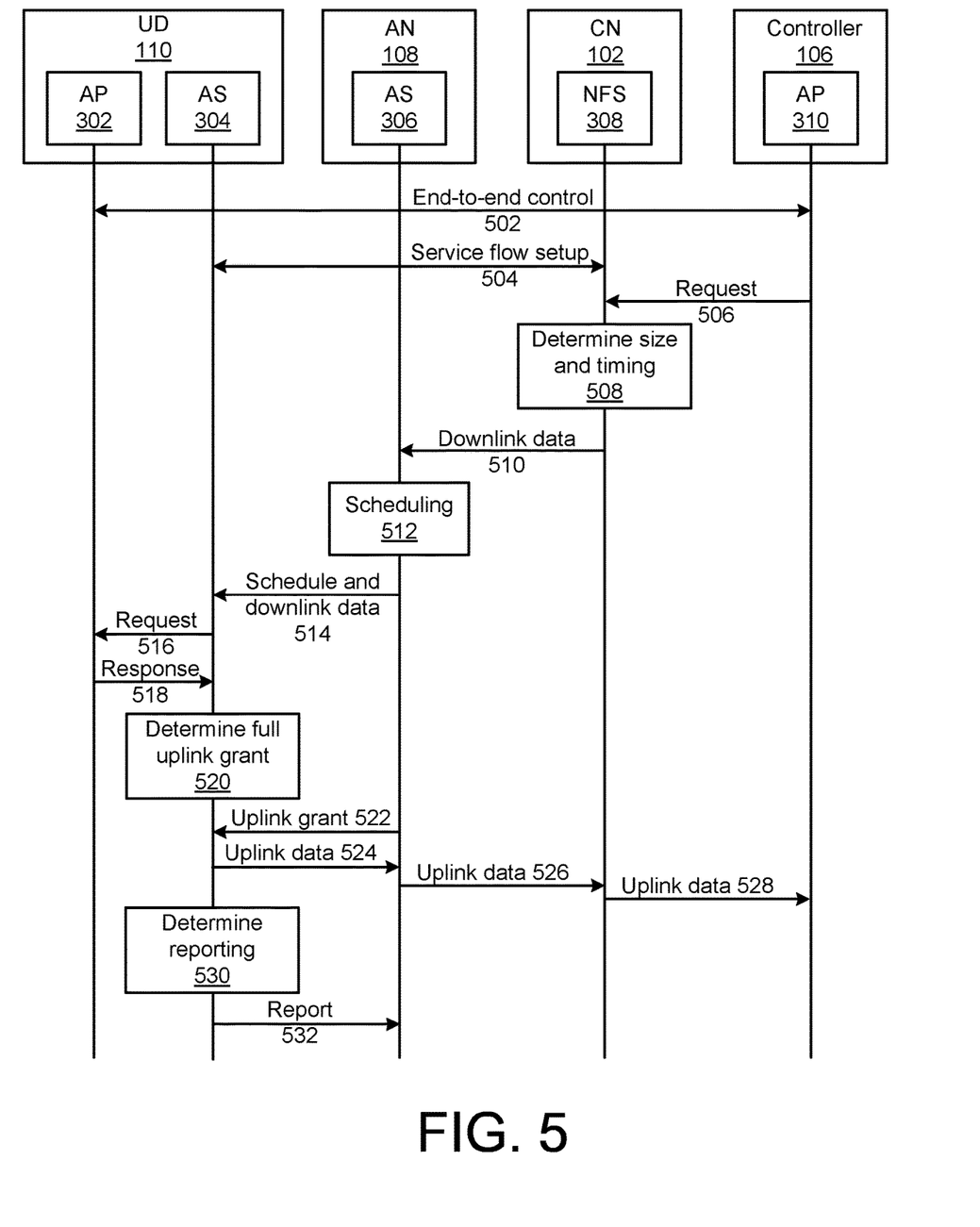
FIG. 5 is a timing diagram showing actions and transmissions for scheduling data according to an example implementation.

FIG. 5 is a timing diagram showing actions and transmissions for scheduling data according to an example implementation. The applications 302, 310 of the user devices 110 and controller 106 can implement end-to-end control 502. The end-to-end control can have similar features as the end-to-end control 312 described above with respect to FIG. 3. One or more of the network functions 308 of the core network 102 can perform service flow setup 504 with the access stratum 304 of the user devices 110. The service flow setup 504 can have similar features as the service flow setup 314 described above with respect to FIG. 3. After the service flow setup 504, the application(s) 310 of the controller 106 can send a request 506 to the network function(s) of the core network 102. The request 506 can have similar features as the request 318 described above with respect to FIG. 3.

After receiving the request 506, the core network 102 can determine sizes and timings (508) of uplink responses associated with downlink data to be sent by the access node 108 to the user devices 110. The downlink data can include commands and/or instructions for the sensors and/or actuators to perform measurements and/or movements. It is noted that the controller 106 may comprise functions of a local serving gateway as well as a local application server for serving factory users. Hence, the determining 508 may be performed by the controller 106.

After determining the sizes and timings (508) of the uplink responses, the core network 102 can send the downlink data 510 to the access node 108. The downlink data 510 can include the commands and/or instructions, as well as the information, such as resource requirements including the determined size and timing information, for the uplink response associated with the downlink data to be sent to the user device 110. The downlink data 510 can have similar features as the downlink data 320 combined with the resource requirements 316 described above with respect to FIG. 3, as the resource requirements included in the downlink data 510 can be dynamic and specific to the individual request 318 of the downlink data.

After receiving the downlink data 510, the access node 108 can perform scheduling (512). The scheduling (512) can include both determining a schedule for the transmission of the downlink data to the user devices 110, and scheduling the associated uplink responses from the user devices 110, based on the downlink data 510 received from the core network 102. The scheduling (512) can have similar features as the scheduling 322 described above with respect to FIG. 3.

After determining the schedule (512), the access node 108 can send schedule and downlink data (514) to the user devices 110. Sending the schedule and downlink data (514) can be performed in a similar manner as sending the scheduling and downlink data 324, described above with respect to FIGS. 3, 4A, and 4B.

After receiving the schedule and downlink data 514 by the user devices 110, the access stratum 304 of the user devices 110 can send requests 516 to the applications 302 of the user devices 110. The requests 516 can include the commands and/or instructions to perform measurements and/or movements included in the downlink data 510. In response to receiving the requests 516, the applications 302 can perform the commanded and/or instructed measurements and/or movements, and send responses 518 to the access stratum for uplink transmissions towards the controller. The responses 518 can include measured data (and/or sensor data) and/or acknowledgments that actions were performed, according to the corresponding closed-loop control applications.

In some examples, the access stratum 304 can send local acknowledgments of the responses 518 to the application 302. The local acknowledgments can be used by the user device 110 to determine whether the response 518 was received by the access stratum 304 too late for the access stratum 304 to include the response 518 in the scheduled uplink grant.

In some examples, after receiving the response 518, the access stratum 304 of the user device 110 may determine a full uplink grant (520) should be received. A full uplink grant can include a larger or actual allocation of uplink communication resources. For the former case in which the full uplink grant includes the larger allocation, the access stratum 304 of the user device 110 can send a request for a full uplink grant to the access stratum 306 of the access node 108. In response to receiving the request for the full uplink grant, the access node 108 can send an uplink grant 522 to the user device 110 in addition to the uplink grant determined in the scheduling 512 and indicated in the schedule 514. For the latter case in which the full uplink grant includes the actual allocation, the access stratum 304 can monitor to receive an uplink grant 522, according to the information indicated in the schedule 514. The uplink grant 522 can include an uplink grant for transmission of an uplink packet with either measurement data or an acknowledgment of the movement instruction. The uplink grant 522 can be included in a physical downlink control channel (PDCCH).

The user devices 110 can send responses in the form of uplink data 524 to the access node 108 using the UL grant provided either in the schedule 514 or the full update grant 522 or both. The uplink data 524 can include measurements by sensors and/or acknowledgments of movement instructions. The access node 108 can forward the uplink data 526 to the core network 102, and the core network 102 can forward the uplink data 528 to the controller 106.

After sending the uplink data 524, the user device 110 can determine whether reporting about buffering the uplink data is needed (530). The user device 110 can determine to report about buffering the uplink data if the uplink response has been in a buffer of the user device 110, such as an L2 buffer, for more than a preconfigured time period, before being sent to the access node 108 at the scheduled uplink grant time. The report can allow the access node 108 to determine an optimized uplink grant for an upcoming closed-loop control cycle, when the closed-loop control has a sufficiently long cycle that the timing is less important. If the user device 110 determines that reporting about buffering the uplink data is needed, the user device 110 can send a report 532 to the access node 108. The report 532 can indicate that the uplink data have been buffered, for example, an L2 buffer for a certain time period before the uplink data can be transmitted using the provided UL grant provided in the schedule 514 or the full UL grant 522. In some examples, the determining (530) can be performed before sending the uplink data 524, and the report 532 can be included with the uplink data 524.

Figure 6:
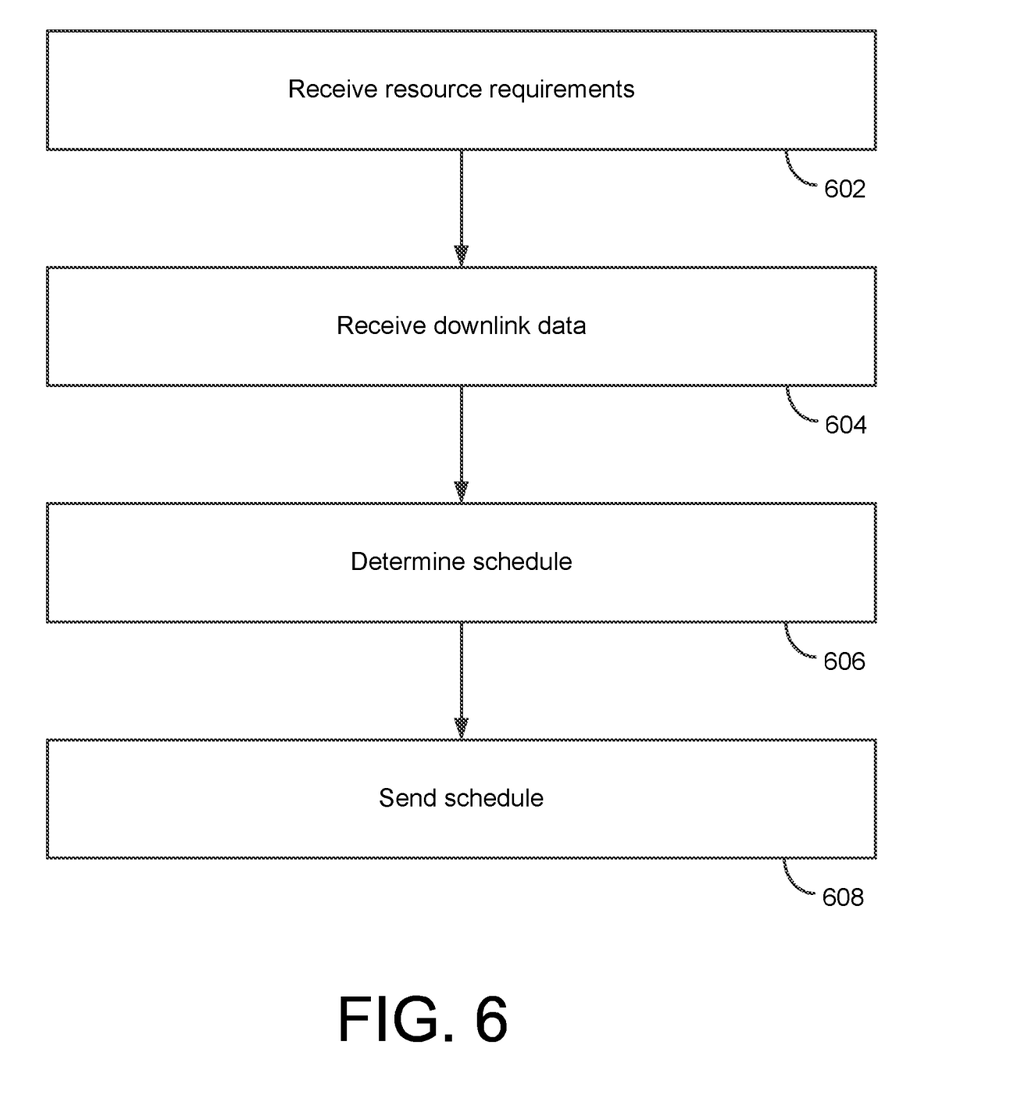
FIG. 6 is a flowchart showing a method for scheduling data according to an example implementation.

FIG. 6 is a flowchart showing a method for scheduling data according to an example implementation. Them method can be performed by an access node, such as the access node 108.

The method can include receiving, from a core network (CN) 102, resource requirements for uplink transmissions corresponding to downlink transmissions of data between the access node 108 and a user device 110 (602).

The method can include receiving, from a core network (CN) 102, resource requirements for uplink transmissions corresponding to downlink transmissions of data between the access node 108 and a user device 110 (602). The method can also include receiving, from the CN 102, downlink data destined for the user device 110 (604). The method can also include determining, based on the received resource requirements, a schedule for the received downlink data and for expected uplink data corresponding to the received downlink data (606). The method can also include sending the schedule to the user device (608).

According to an example, the received resource requirements for uplink transmissions can comprise a size and/or a timing information of at least one uplink transmission included in the uplink transmissions, and the determining can comprise determining, based on the size and/or the timing of the at least one uplink transmission, the schedule for the received downlink data and for the expected uplink data corresponding to the received downlink data.

According to an example, the uplink transmissions can be carried out by using an established uplink logical channel and downlink transmissions can be carried out by using an established downlink logical channel.

According to an example, the method can further include sending the received downlink data to the user device according to the schedule. The schedule can instruct the user device to send downlink instructions included in the downlink data to at least one sensor and at least one actuator, receive sensor data from the at least one sensor, and receive at least one acknowledgment from the at least one actuator. The method can further include receiving the sensor data and at least one acknowledgment from the user device.

According to an example, the schedule for both the received downlink data and expected uplink data can be included in a single instance of a physical downlink control channel (PDCCH).

According to an example, the schedule can include a downlink schedule for the received downlink data and an uplink schedule for the expected uplink data, and the downlink schedule can be included in a physical downlink control channel (PDCCH), the PDCCH further comprising an indication that the uplink schedule will be included in a message that also includes the received downlink data.

According to an example, the method can further comprise sending, within a single transport block (TB), the received downlink data and the uplink schedule.

According to an example, the resource requirements can comprise size and/or timing information of expected uplink data, and the method can further comprise sending the downlink data to the user device.

According to an example, the determining the schedule and sending the schedule can be performed without receiving a scheduling request from the user device.

Figure 7:
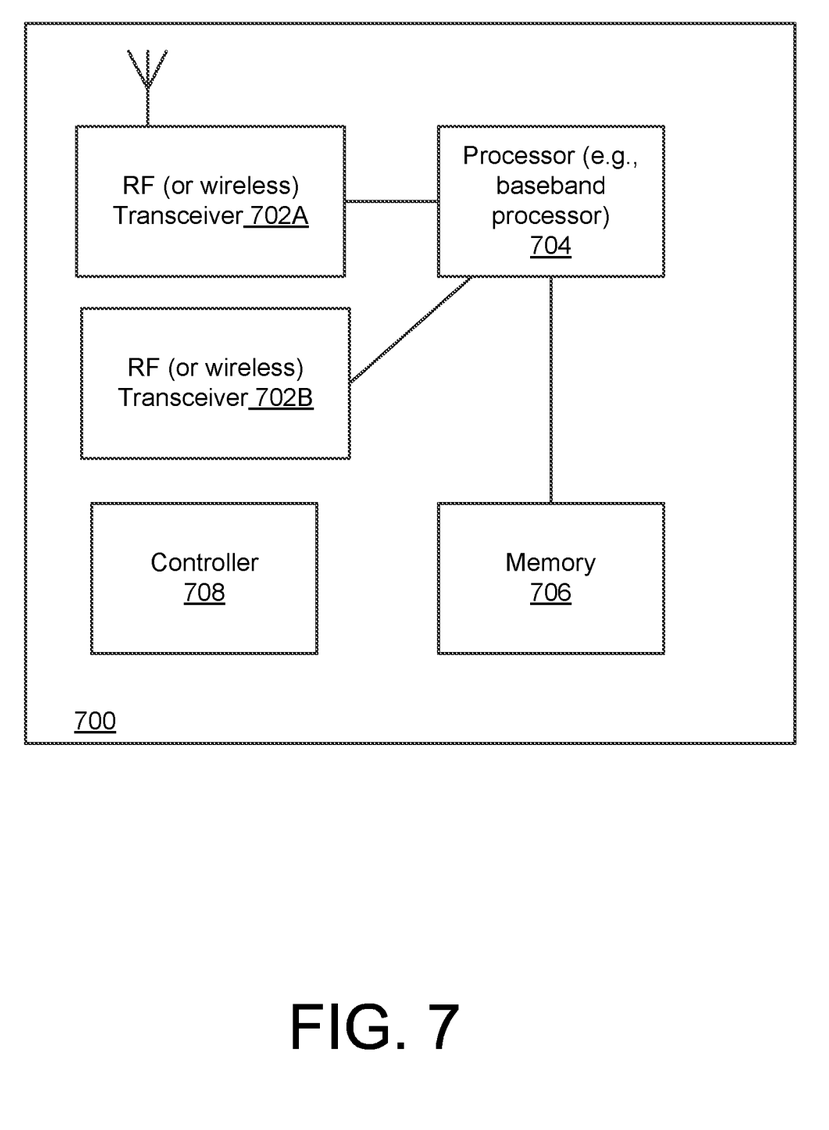
FIG. 7 is a diagram of a wireless station according to an example implementation.

FIG. 7 is a diagram of a wireless station 700 according to an example implementation. The wireless station 700 can include an apparatus such as an access node 108 and/or base station, user device 110, or sensor/actuator 112, according to example implementations. The wireless station 700 may include, for example, one or two RF (radio frequency) or wireless transceivers 702A, 702B, where each wireless transceiver includes a transmitter to transmit signals and a receiver to receive signals. The wireless station 700 also includes a processor or control unit/entity (controller) 704 to execute instructions or software and control transmission and receptions of signals, and a memory 706 to store data and/or instructions. The memory 706 can comprise a non-transitory computer-readable storage device comprising instructions stored thereon that, when executed by the at least one processor, are configured to cause the wireless station 700 to perform any combination of functions, techniques, and/or method described herein.

Processor 704 may also make decisions or determinations, generate frames, packets or messages for transmission, decode received frames or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the station 700, and may provide control for other systems not shown in FIG. 7, such as controlling input/output devices (e.g., display, keypad), and/or may execute software for one or more applications that may be provided on wireless station 700, such as, for example, an email program, audio/video applications, a word processor, a Voice over IP application, or other application or software.

In addition, a storage medium may be provided that includes stored instructions, which when executed by a controller or processor may result in the processor 704, or other controller or processor, performing one or more of the functions or tasks described above.

According to another example implementation, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method performed by an access node, the method comprising :
   receiving, from a core network (CN) , dynamic resource requirements for uplink transmissions corresponding to downlink transmissions of data between the access node and a user device, wherein both the uplink transmissions and the downlink transmissions correspond to closed-loop control events;
   receiving, from the CN, downlink data destined for the user device with an indication that real-time feedback from the user device is expected;
   determining, based on the received dynamic resource requirements, an adaptive schedule for the received downlink data and for expected uplink data corresponding to the received downlink data, wherein:
      the adaptive schedule comprises a downlink schedule for the received downlink data and an uplink schedule for the expected uplink data, and
      the downlink schedule is included in a physical downlink control channel (PDCCH), the PDCCH further comprising an indication that the uplink schedule will be included in a message that also includes the received downlink data;
   configuring the adaptive schedule to account for real-time network conditions and user device characteristics corresponding to closed-loop control events, wherein the closed-loop control events each include a downlink transmission followed by a synchronous uplink transmission, and parallel closed-loop control events occur isochronously for multiple user devices; and
   sending the adaptive schedule to the user device, wherein the determination of the adaptive schedule, and the sending of the adaptive schedule, are performed by the access node for each user device individually.

2. The method of claim 1, wherein :
   the received dynamic resource requirements for uplink transmissions comprise a size and a timing information of at least one uplink transmission included in the uplink transmissions; and
   the determining comprises determining, based on the size and the timing information of the at least one uplink transmission, the adaptive schedule for the received downlink data and for the expected uplink data corresponding to the received downlink data.

3. The method of claim 1, wherein :
   the uplink transmissions are carried out by using an established uplink logical channel and downlink transmissions are carried out by using an established downlink logical channel respectively; and
   both the established uplink logical channel and the established downlink logical channel are established autonomously by the access node without receiving a scheduling request from the user device.

4. The method of claim 1, wherein the adaptive schedule for both the received downlink data and expected uplink data is included in a single instance of the physical downlink control channel (PDCCH).

5. The method of claim 1, further comprising sending, within a single transport block (TB), the received downlink data and an indication of uplink grant, wherein the access node signals the uplink grant for uplink response to the user device with a single-bit indication.

6. The method of claim 1, wherein :
   the dynamic resource requirements comprise size and timing information of the expected uplink data specific to the received downlink data; and
   the method further comprises sending the received downlink data to the user device without receiving a scheduling request from the user device.

7. The method of claim 1, wherein the determining the adaptive schedule and sending the adaptive schedule to the user device are performed without receiving a scheduling request from the user device.

8. An apparatus comprising :
   at least one processor; and
   a non-transitory computer-readable storage device comprising instructions stored thereon that, when executed by the at least one processor, are configured to cause the apparatus to:
      receive, from a core network (CN) , dynamic resource requirements for uplink transmissions corresponding to downlink transmissions of data between the apparatus and a user device, wherein both the uplink transmissions and the downlink transmissions correspond to a closed-loop control events;
      receive, from the CN, downlink data destined for the user device with an indication that real-time feedback from the user device is expected;
      determine, based on the received dynamic resource requirements, an adaptive schedule for the received downlink data and for expected uplink data corresponding to the received downlink data, wherein:
         the adaptive schedule comprises a downlink schedule for the received downlink data and an uplink schedule for the expected uplink data, and
         the downlink schedule is included in a physical downlink control channel (PDCCH), the PDCCH further comprising an indication that the uplink schedule will be included in a message that also includes the received downlink data;
      configure the adaptive schedule to account for real-time network conditions and user device characteristics corresponding to closed-loop control events, wherein the closed-loop control events each include a downlink transmission followed by a synchronous uplink transmission, and parallel closed-loop control events occur isochronously for multiple user devices; and send the adaptive schedule to the user device, wherein the determination of the adaptive schedule, and the sending of the adaptive schedule, are performed by the apparatus for each user device individually.

9. The apparatus of claim 8, wherein:
the received dynamic resource requirements for uplink transmissions include a size and a timing information of at least one uplink transmission included in the uplink transmissions; and
the determining includes determining, based on the size and the timing information of the at least one uplink transmission, the adaptive schedule for the received downlink data and for the expected uplink data corresponding to the received downlink data.

10. The apparatus of claim 8, wherein:
the uplink transmissions and downlink transmissions are transmitted via an established uplink logical channel and an established downlink logical channel respectively; and
both the established uplink logical channel and the established downlink logical channel are established autonomously by the apparatus without receiving a scheduling request from the user device.

11. The apparatus of claim 8, wherein the adaptive schedule for both the received downlink data and expected uplink data is included in a single instance of the physical downlink control channel (PDCCH).

12. The apparatus of claim 8, wherein the instructions, when executed by the at least one processor, are further configured to cause the apparatus to send, within a single transport block (TB), the received downlink data and an indication of uplink grant, wherein the apparatus signals the uplink grant for uplink response to the user device with a single-bit indication.

13. The apparatus of claim 8, wherein:
the dynamic resource requirements comprise size and timing information of the expected uplink data specific to the received downlink data; and
the instructions, when executed by the at least one processor, are further configured to cause the apparatus to send the received downlink data to the user device without receiving a scheduling request from the user device.

14. The apparatus of claim 8, wherein the determining the adaptive schedule and sending the adaptive schedule to the user device are performed without receiving a scheduling request from the user device.

15. A non-transitory computer-readable storage device comprising instructions stored thereon that, when executed by at least one processor, are configured to cause a wireless station to:
receive, from a core network (CN), dynamic resource requirements for uplink transmissions corresponding to downlink transmissions of data between the wireless station and a user device, wherein both the uplink transmissions and the downlink transmissions correspond to closed-loop control events;
receive, from the CN, downlink data destined for the user device with an indication that real-time feedback from the user device is expected;
determine, based on the received dynamic resource requirements, an adaptive schedule for the received downlink data and for expected uplink data corresponding to the received downlink data, wherein:
the adaptive schedule comprises a downlink schedule for the received downlink data and an uplink schedule for the expected uplink data, and
the downlink schedule is included in a physical downlink control channel (PDCCH), the PDCCH further comprising an indication that the uplink schedule will be included in a message that also includes the received downlink data;
configure the adaptive schedule to account for real-time network conditions and user device characteristics corresponding to closed-loop control events, wherein the closed-loop control events each include a downlink transmission followed by a synchronous uplink transmission, and parallel closed-loop control events occur isochronously for multiple user devices; and
send the adaptive schedule to the user device, wherein the determination of the adaptive schedule, and the sending of the adaptive schedule, are performed by the wireless station for each user device individually.

16. The non-transitory computer-readable storage device of claim 15, wherein:
the received dynamic resource requirements for uplink transmissions include a size and a timing information of at least one uplink transmission included in the uplink transmissions; and
the determining includes determining, based on the size and the timing information of the at least one uplink transmission, the adaptive schedule for the received downlink data and for the expected uplink data corresponding to the received downlink data.

* * * * *